US010673495B2

(12) United States Patent
Xu et al.

(10) Patent No.: US 10,673,495 B2
(45) Date of Patent: Jun. 2, 2020

(54) ANTENNA PORT CONFIGURATION METHOD AND APPARATUS

(71) Applicant: HUAWEI TECHNOLOGIES CO., LTD., Shenzhen, Guangdong (CN)

(72) Inventors: Chao Xu, Shanghai (CN); Peng Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/387,960

(22) Filed: Apr. 18, 2019

(65) Prior Publication Data

US 2019/0245589 A1 Aug. 8, 2019

Related U.S. Application Data

(63) Continuation of application No. PCT/CN2016/102927, filed on Oct. 21, 2016.

(51) Int. Cl.
*H04B 7/04* (2017.01)
*H04W 72/04* (2009.01)
(Continued)

(52) U.S. Cl.
CPC .............. *H04B 7/04* (2013.01); *G06F 9/3004* (2013.01); *H04B 7/022* (2013.01); *H04B 7/2643* (2013.01);
(Continued)

(58) Field of Classification Search
CPC ........ H04B 7/04; H04B 7/022; H04B 7/2643; H04B 7/0452; H04B 17/318;
(Continued)

(56) References Cited

U.S. PATENT DOCUMENTS 9,462,520 B2 10/2016 Siomina et al.
10,334,662 B2 * 6/2019 Chen ................. H04W 52/0216
(Continued)

FOREIGN PATENT DOCUMENTS

CN 103391576 A 11/2013
CN 103688585 A 3/2014
(Continued)

OTHER PUBLICATIONS

Extended European Search Report issued in European Application No. 16919416.4 dated Jun. 18, 2019, 8 pages.
(Continued)

*Primary Examiner* — Dac V Ha
(74) *Attorney, Agent, or Firm* — Fish & Richardson P.C.

(57) ABSTRACT

Example antenna port configuration methods and apparatuses are provided. One example method includes obtaining, by an access network device, M reference signal received power RSRP differences, where the M RSRP differences indicate radio signal strengths of N radio remote units RRUs, and both M and N are positive integers greater than 1. Based on the M RSRP differences, the access network device can determine an order of traversing the N RRUs. For any RRU of the N RRUs, the access network device can configure same antenna ports for two RRUs in the traversal order that are adjacent to the RRU, and can configure different antenna ports for the RRU and the RRUs adjacent to the RRU.

15 Claims, 3 Drawing Sheets

(51) Int. Cl.
  *H04W 88/08* (2009.01)
  *H04B 7/022* (2017.01)
  *H04L 5/00* (2006.01)
  *H04W 24/08* (2009.01)
  *G06F 9/30* (2018.01)
  *H04B 7/26* (2006.01)

(52) U.S. Cl.
  CPC .............. *H04L 5/00* (2013.01); *H04L 5/0005* (2013.01); *H04W 24/08* (2013.01); *H04W 72/04* (2013.01); *H04W 88/085* (2013.01)

(58) Field of Classification Search
  CPC ... H04W 24/08; H04W 88/085; H04W 72/04; H04L 5/00; H04L 5/0005; G06F 9/3004
  See application file for complete search history.

(56) References Cited

U.S. PATENT DOCUMENTS

| | | | |
|---|---|---|---|
| 10,454,541 B2* | 10/2019 | Sundararajan | H04W 72/042 |
| 2013/0128760 A1 | 5/2013 | Fujishima et al. | |
| 2014/0211656 A1* | 7/2014 | Hu | H04B 7/024 370/252 |
| 2015/0043463 A1* | 2/2015 | Yamazaki | H04W 16/28 370/329 |
| 2015/0063287 A1 | 3/2015 | Mazzarese et al. | |
| 2015/0271683 A1 | 9/2015 | Yan et al. | |
| 2017/0230991 A1 | 8/2017 | Yan et al. | |
| 2019/0020393 A1* | 1/2019 | Yuan | H04B 7/0617 |

FOREIGN PATENT DOCUMENTS

| | | |
|---|---|---|
| CN | 103813376 A | 5/2014 |
| CN | 105636219 A | 6/2016 |
| EP | 2941039 A1 | 11/2015 |

OTHER PUBLICATIONS

R1-1608610—Huawei, HiSilicon, "Potential enhancements and specification impact analysis of non-coherent JT," 3GPP TSG RAN WG1 Meeting #86bis, Lisbon, Portugal, Oct. 10-14, 2016, 5 pages.

International Search Report and Written Opinion issued in International Application No. PCT/CN2016/102927 dated Jul. 26, 2017, 20 pages.

Office Action issued in Chinese Application No. 201680085381.5 dated Dec. 12, 2019, 10 pages (with English translation).

* cited by examiner

ANTENNA PORT CONFIGURATION METHOD AND APPARATUS

CROSS-REFERENCE TO RELATED APPLICATIONS

This application is a continuation of International Application No. PCT/CN2016/102927, filed on Oct. 21, 2016, the disclosure of which is hereby incorporated by reference in its entirety.

TECHNICAL FIELD

This application relates to the field of antenna technologies, and in particular, to an antenna port configuration method and apparatus.

BACKGROUND

A radio remote unit (RRU) in a digital indoor distributed system in a live network includes 2×2 antennas, that is, includes two transmit antennas and two receive antennas. In an indoor scenario, when leveling spatial isolation is relatively low, an overlapping area (referred to as a "cell joint area" below) between different RRUs is relatively large. In addition, indoor space is relatively enclosed, and therefore the cell joint area is subject to less external interference, and a signal to interference plus noise ratio is high and correlation is low in the overlapping area. In this case, a relatively high three-stream multiplexing/four-stream multiplexing ratio can be obtained.

In a current digital indoor distributed system network, when a quantity of RRUs is not increased, different logical port numbers may be configured for antenna ports of two RRUs that have an overlapping coverage area, so that a four-receive antenna (4R) terminal in a joint area between the two RRUs supports 4×4 virtual multiple-input multiple-output (MIMO), thereby increasing a spatial multiplexing gain of the 4R terminal, and obtaining a higher data transfer rate.

However, when a plurality of RRUs coexist, a problem to be resolved urgently is how to configure antenna ports for each RRU to enable the terminal to more easily enter, when moving in coverage areas of the plurality of RRUs, a cell joint area in which the terminal supports 4×4 virtual MIMO.

SUMMARY

Embodiments of this application provide an antenna port configuration method and apparatus, to configure antenna ports for each RRU, to increase a spatial multiplexing gain of a terminal in coverage areas of RRUs, and obtain a higher data transfer rate.

According to a first aspect, an embodiment of this application provides an antenna port configuration method, including:

obtaining, by an access network device, M reference signal received power RSRP differences, where the M RSRP differences indicate radio signal strengths of N radio remote units RRUs, and both M and N are positive integers greater than 1;

determining, by the access network device based on the M RSRP differences, an order of traversing the N RRUs; and for any RRU of the N RRUs, configuring, by the access network device, same antenna ports for two RRUs in the traversal order that are adjacent to the RRU, and configuring different antenna ports for the RRU and the RRUs adjacent to the RRU.

According to the method provided in this embodiment of this application, after obtaining the M RSRP differences, the access network device determines, based on the M RSRP differences, the order of traversing the N RRUs, and then configures same antenna ports for the two RRUs in the traversal order that are adjacent to the RRU, and configures different antenna ports for the RRU and the RRUs adjacent to the RRU. Different antenna ports are configured for two adjacent RRUs in the traversal order. Therefore, when moving in coverage areas of the N RRUs, a terminal can more easily enter a cell joint area in which the terminal supports 4×4 virtual MIMO, thereby increasing a spatial multiplexing gain of the terminal in the coverage areas of the RRUs, and obtaining a higher data transfer rate.

Optionally, the N RRUs work in a time division duplex TDD mode; and any one of the M RSRP differences is a difference between downlink RSRPs of two of the N RRUs.

The determining, by the access network device based on the M RSRP differences, an order of traversing the N RRUs includes:

selecting, by the access network device, one RRU from the N RRUs as a target RRU;

using, as a target RSRP difference by the access network device, a minimum RSRP difference in the M RSRP differences that is determined based on a downlink RSRP of the target RRU;

marking, by the access network device, the target RRU, using the other RRU used for determining the target RSRP difference as a new target RRU, and returning to the step of using, as a target RSRP difference, a minimum RSRP difference in the M RSRP differences that is determined based on a downlink RSRP of the target RRU, until all of the N RRUs are marked; and determining, by the access network device, an order of marking all the N RRUs as the order of traversing the N RRUs.

Optionally, the N RRUs work in a frequency division duplex FDD mode; and any one of the M RSRP differences is a difference between a downlink RSRP of one of the N RRUs and an uplink RSRP of a terminal.

The determining, by the access network device based on the M RSRP differences, an order of traversing the N RRUs includes:

sorting, by the access network device, the M RSRP differences in ascending/descending order;

sequentially marking, by the access network device based on an order of the sorted M RSRP differences, the RRUs corresponding to all the RSRP differences; and determining, by the access network device, an order of marking all the N RRUs as the order of traversing the N RRUs.

Optionally, the configuring, by the access network device, same antenna ports for two RRUs in the traversal order that are adjacent to the RRU, and configuring different antenna ports for the RRU and the RRUs adjacent to the RRU includes:

configuring, by the access network device, logical port numbers of the antenna ports of the two RRUs in the traversal order that are adjacent to the RRU as 0 and 1, and configuring logical port numbers of antenna ports of the RRU as 2 and 3.

Optionally, after the configuring, by the access network device, same antenna ports for two RRUs in the traversal order that are adjacent to the RRU, and configuring different antenna ports for the RRU and the RRUs adjacent to the RRU, the method further includes:

obtaining, by the access network device, a quantity of terminals in each of K cell joint areas, where each of the K cell joint areas is an area formed by an overlapping area between two of the N RRUs;

determining, by the access network device, P cell joint areas including largest quantities of terminals in the K cell joint areas, where P is less than or equal to K; and if determining that a target cell joint area exists in the P cell joint areas, configuring, by the access network device, different logical port numbers for antenna ports of two RRUs corresponding to the target cell joint area, where the target cell joint area is an area in which same logical port numbers are configured for the antenna ports of the two corresponding RRUs.

An embodiment of this application provides an antenna port configuration apparatus, including:

a transceiver unit, configured to obtain M reference signal received power RSRP differences, where the M RSRP differences indicate radio signal strengths of N radio remote units RRUs, and both M and N are positive integers greater than 1; and a processing unit, configured to: determine, based on the M RSRP differences, an order of traversing the N RRUs; and for any RRU of the N RRUs, configure same antenna ports for two RRUs in the traversal order that are adjacent to the RRU, and configure different antenna ports for the RRU and the RRUs adjacent to the RRU.

Optionally, the N RRUs work in a time division duplex TDD mode; and any one of the M RSRP differences is a difference between downlink RSRPs of two of the N RRUs.

The processing unit is configured to:
select one RRU from the N RRUs as a target RRU;
use, as a target RSRP difference, a minimum RSRP difference in the M RSRP differences that is determined based on a downlink RSRP of the target RRU;
mark the target RRU, use the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and
determine an order of marking all the N RRUs as the order of traversing the N RRUs.

Optionally, the N RRUs work in a frequency division duplex FDD mode; and any one of the M RSRP differences is a difference between a downlink RSRP of one of the N RRUs and an uplink RSRP of a terminal.

The processing unit is configured to:
sort the M RSRP differences in ascending/descending order;
sequentially mark, based on an order of the sorted M RSRP differences, the RRUs corresponding to all the RSRP differences; and
determine an order of marking all the N RRUs as the order of traversing the N RRUs.

Optionally, the processing unit is configured to:
configure logical port numbers of the antenna ports of the two RRUs in the traversal order that are adjacent to the RRU as 0 and 1, and configure logical port numbers of antenna ports of the RRU as 2 and 3.

Optionally, the processing unit is further configured to:
obtain a quantity of terminals in each of K cell joint areas, where each of the K cell joint areas is an area formed by an overlapping area between two of the N RRUs;
determine P cell joint areas including largest quantities of terminals in the K cell joint areas, where P is less than or equal to K; and
if determining that a target cell joint area exists in the P cell joint areas, configure different logical port numbers for antenna ports of two RRUs corresponding to the target cell joint area, where the target cell joint area is an area in which same logical port numbers are configured for the antenna ports of the two corresponding RRUs.

An embodiment of this application provides an antenna port configuration apparatus, including:

a transceiver, configured to obtain M reference signal received power RSRP differences, where the M RSRP differences indicate radio signal strengths of N radio remote units RRUs, and both M and N are positive integers greater than 1; and a processor, configured to: determine, based on the M RSRP differences, an order of traversing the N RRUs, and for any RRU of the N RRUs, configure same antenna ports for two RRUs in the traversal order that are adjacent to the RRU, and configure different antenna ports for the RRU and the RRUs adjacent to the RRU.

Optionally, the N RRUs work in a time division duplex TDD mode; and any one of the M RSRP differences is a difference between downlink RSRPs of two of the N RRUs.

The processor is configured to:
select one RRU from the N RRUs as a target RRU;
use, as a target RSRP difference, a minimum RSRP difference in the M RSRP differences that is determined based on a downlink RSRP of the target RRU;
mark the target RRU, use the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and
determine an order of marking all the N RRUs as the order of traversing the N RRUs.

Optionally, the N RRUs work in a frequency division duplex FDD mode; and any one of the M RSRP differences is a difference between a downlink RSRP of one of the N RRUs and an uplink RSRP of a terminal.

The processor is configured to:
sort the M RSRP differences in ascending/descending order;
sequentially mark, based on an order of the sorted M RSRP differences, the RRUs corresponding to all the RSRP differences; and
determine an order of marking all the N RRUs as the order of traversing the N RRUs.

Optionally, the processor is configured to:
configure logical port numbers of the antenna ports of the two RRUs in the traversal order that are adjacent to the RRU as 0 and 1, and configure logical port numbers of antenna ports of the RRU as 2 and 3.

Optionally, the processor is further configured to:
obtain a quantity of terminals in each of K cell joint areas, where each of the K cell joint areas is an area formed by an overlapping area between two of the N RRUs;

determine P cell joint areas including largest quantities of terminals in the K cell joint areas, where P is less than or equal to K; and if determining that a target cell joint area exists in the P cell joint areas, configure different logical port numbers for antenna ports of two RRUs corresponding to the target cell joint area, where the target cell joint area is an area in which same logical port numbers are configured for the antenna ports of the two corresponding RRUs.

DESCRIPTION OF EMBODIMENTS

The embodiments of this application are applicable to a 4G (fourth generation mobile communications system) evolved system such as an Long Term Evolution (LTE) system, a 5G (fifth generation mobile communications system) system, and a communications network such as a cloud radio access network (CRAN).

In the embodiments of this application, the term "terminal" includes but is not limited to a mobile station, a fixed or mobile subscriber unit, a pager, a cellular phone, a personal digital assistant (PDA), a computer, or any other type of user equipment (UE) that can work in a radio environment. The term "access network device" includes but is not limited to a base station, a node, a base station controller, an access point (AP), a remote node, or any other type of interface device that can work in a radio environment.

Figure 1:
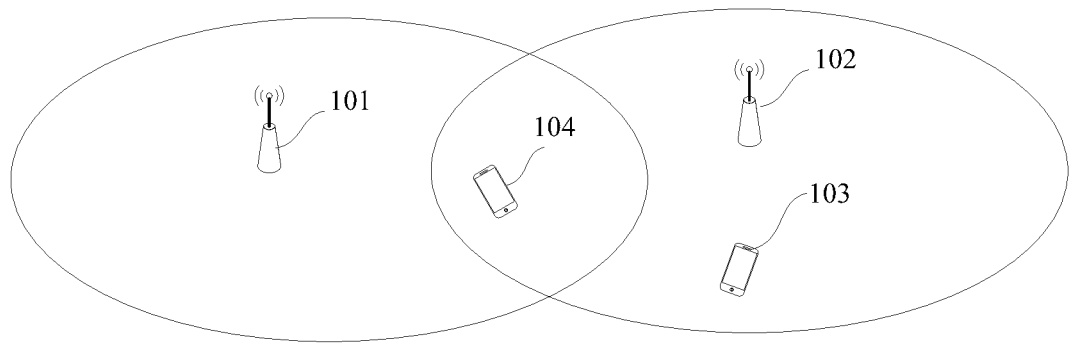
FIG. 1 is a schematic diagram of a communications architecture according to an embodiment of this application.

Currently, a 4×4 terminal becomes increasingly popular, but an RRU in a digital indoor distributed system in a live network still includes 2×2 antennas. Therefore, a terminal can send or receive data by using only a maximum of two antennas each time. As a result, a transfer rate for sending or receiving data by the terminal is limited by the RRU. To enable the terminal to obtain a higher data transfer rate, different antenna ports may be configured for two adjacent RRUs. When the two RRUs for which the different antenna ports are configured communicate with a same terminal, the terminal can simultaneously and separately communicate with all the RRUs through the different antenna ports. Therefore, the terminal in a cell joint area between the two RRUs can send or receive data by using four antennas, thereby increasing a spatial multiplexing gain of the terminal in coverage areas of the RRUs, and obtaining a higher data transfer rate. FIG. 1 is a schematic diagram of a communications architecture according to an embodiment of this application. In FIG. 1, logical port numbers of antenna ports of an RRU 101 are configured as 0 and 1, and logical port numbers of antenna ports of an RRU 102 are configured as 2 and 3. A terminal 103 in a coverage area of the RRU 102 can communicate with the RRU 102 only through the antenna ports 2 and 3, while a terminal 104 in an overlapping coverage area between the RRU 101 and the RRU 102 may simultaneously communicate with the RRU 101 through the antenna ports 0 and 1 and communicate with the RRU 102 through the antenna ports 2 and 3.

However, when a plurality of RRUs coexist, a problem to be resolved urgently is how to appropriately configure antenna ports for each RRU to configure antenna ports of as many adjacent RRUs as possible to be different.

Figure 2:
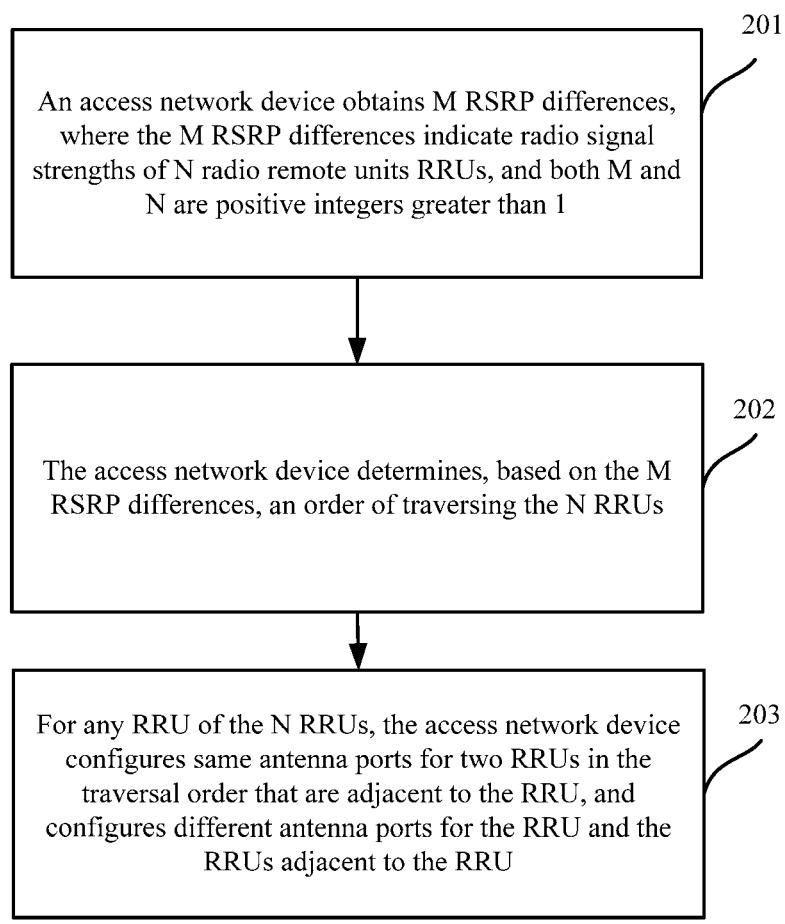
FIG. 2 is a schematic flowchart of an antenna port configuration method according to an embodiment of this application.

Based on the foregoing descriptions, FIG. 2 is a schematic flowchart of an antenna port configuration method according to an embodiment of this application. The method includes the following steps.

Step 201: An access network device obtains M RSRP differences, where the M RSRP differences indicate radio signal strengths of N radio remote units RRUs, and both M and N are positive integers greater than 1.

An English full name of RSRP is reference signal received power, and reference signal received power is briefly referred to as RSRP below.

Step 202: The access network device determines, based on the M RSRP differences, an order of traversing the N RRUs.

Step 203: For any RRU of the N RRUs, the access network device configures same antenna ports for two RRUs in the traversal order that are adjacent to the RRU, and configures different antenna ports for the RRU and the RRUs adjacent to the RRU.

In step 201, the access network device may obtain the M RSRP differences in different manners.

In a possible implementation, when the N RRUs work in a time division duplex (TDD) mode, any one of the M RSRP differences is a difference between downlink RSRPs of two of the N RRUs.

In this implementation, the N RRUs may send a signal to each other. The RSRP can be used to measure a power of a downlink reference signal, so that each RRU can determine an RSRP difference between the RRU and another RRU by receiving a signal sent by the another RRU, and then the access network device can determine the M RSRP differences of the N RRUs.

In a possible implementation, when the N RRUs work in a frequency division duplex (FDD) mode, any one of the M RSRP differences is a difference between a downlink RSRP of one of the N RRUs and an uplink RSRP of a terminal.

In this implementation, all the N RRUs send signals to a same terminal, and receive signals sent by the terminal, so that the access network device obtains a difference between a downlink RSRP of each RRU and an uplink RSRP of the terminal, to determine the M RSRP differences.

It should be noted that the N RRUs may not be RRUs connected to the access network device by using an interface such as a common public radio interface (CPRI), and the N RRUs may be RRUs in a same preset area.

How the access network device obtains the M RSRP differences is not limited in this embodiment of this application.

In step 202, the access network device determines, based on a mode in which the N RRUs work, the order of traversing the N RRUs. When the N RRUs work in the TDD mode, the access network device may determine, in the following steps, the order of traversing the N RRUs.

Step 1: The access network device selects one RRU from the N RRUs as a target RRU.

Step 2: The access network device uses, as a target RSRP difference, a minimum RSRP difference in the M RSRP differences that is determined based on a downlink RSRP of the target RRU.

Step 3: The access network device marks the target RRU, uses the other RRU used for determining the target RSRP difference as a new target RRU, and returns to the step of using, as a target RSRP difference, a minimum RSRP difference in the M RSRP differences that is determined based on a downlink RSRP of the target RRU, until all of the N RRUs are marked.

It should be noted that if the determined new target RRU is a marked RRU, an unmarked RRU is reselected from the N RRUs as a target RRU, and step 2 is returned, to be specific, the step of using, as a target RSRP difference, a minimum RSRP difference in the M RSRP differences that is determined based on a downlink RSRP of the target RRU is returned.

Step 4: The access network device determines an order of marking all the N RRUs as the order of traversing the N RRUs.

According to the foregoing method, the access network device may determine a shortest path from each RRU to another RRU in the N RRUs, to determine a relative position relationship between all the RRUs.

Correspondingly, when the N RRUs work in the FDD mode, the access network device may determine, in the following steps, the order of traversing the N RRUs.

Step 1: The access network device sorts the M RSRP differences in ascending/descending order.

It should be noted that the access network device may sort the M RSRP differences in descending order, or sort the M RSRP differences in ascending order.

Step 2: The access network device sequentially marks, based on an order of the sorted M RSRP differences, the RRUs corresponding to all the RSRP differences.

Step 3: The access network device determines an order of marking all the N RRUs as the order of traversing the N RRUs.

Finally, in step 203, the access network device configures antenna ports for each RRU based on the order of traversing the N RRUs. For any RRU of the N RRUs, the access network device configures logical port numbers of the antenna ports of the two RRUs in the traversal order that are adjacent to the RRU as 0 and 1, and configures logical port numbers of antenna ports of the RRU as 2 and 3. Alternatively, for any RRU of the N RRUs, the access network device configures logical port numbers of the antenna ports of the two RRUs in the traversal order that are adjacent to the RRU as 2 and 3, and configures logical port numbers of antenna ports of the RRU as 0 and 1. In addition, for any RRU of the N RRUs, the access network device may configure logical port numbers of the antenna ports of the two RRUs in the traversal order that are adjacent to the RRU as 0 and 1, and configure logical port numbers of antenna ports of the RRU as 2 and 3. Alternatively, for any RRU of the N RRUs, the access network device sets transmission modes (TM) of the two RRUs in the traversal order that are adjacent to the RRU to a TM 4, and sets a transmission mode of the RRU to a TM 9.

Optionally, after determining the order of traversing the N RRUs, the access network device may further number the N RRUs based on the traversal order, and then configure logical port numbers of antenna ports of an even-numbered RRU as 0 and 1, and configure logical port numbers of antenna ports of an odd-numbered RRU as 2 and 3, to complete antenna port configuration. In addition, the access network device may set a transmission mode of the even-numbered RRU to the TM 4, and set a transmission mode of the odd-numbered RRU to the TM 9. Certainly, the access network device may configure logical port numbers of antenna ports of an even-numbered RRU as 2 and 3, and configure logical port numbers of antenna ports of an odd-numbered RRU as 0 and 1.

It should be noted that RRUs for which same logical port numbers of antenna ports are configured perform non-coherent joint transmission (JT) with each other, and RRUs for which different logical port numbers of antenna ports are configured perform coherent JT with each other.

According to the foregoing method, the access network device determines the order of traversing the N RRUs based on the M RSRP differences, and then configures different antenna ports for two adjacent RRUs in the traversal order based on the order of traversing the N RRUs. The order of traversing the N RRUs that is determined based on the M RSRP differences reflects spatial isolation between the RRUs. Therefore, the N RRUs for which antenna ports have been configured may obtain a relatively large quantity of cell joint areas that support 4×4 virtual MIMO, thereby increasing a spatial multiplexing gain of a terminal in coverage areas of the N RRUs, so that the terminal obtains a higher data transfer rate.

With reference to the foregoing descriptions, optionally, after the antenna ports of the N RRUs are configured, the antenna ports of the RRUs may be further adjusted. The following provides description by using an example in which the coverage areas of the N RRUs include K cell joint areas. Each cell joint area is an area formed by an overlapping area between two RRUs.

In step 1, the access network device may periodically collect statistics on information about a terminal connected to each RRU, where the terminal information includes but is not limited to a quantity of terminals, terminal signal quality, and the like.

Then, in step 2, the access network device obtains a quantity of terminals in each of the K cell joint areas.

Then, in step 3, the access network device determines P cell joint areas including largest quantities of terminals in the K cell joint areas, where P is less than or equal to K.

Finally, in step 4, if determining that a target cell joint area exists in the P cell joint areas, the access network device configures different logical port numbers for antenna ports of two RRUs corresponding to the target cell joint area, where the target cell joint area is an area in which same logical port numbers are configured for the antenna ports of the two corresponding RRUs.

Certainly, in step 2 and step 3, the quantity of terminals may be replaced with terminal signal quality, and details are not described herein.

Figure 3:
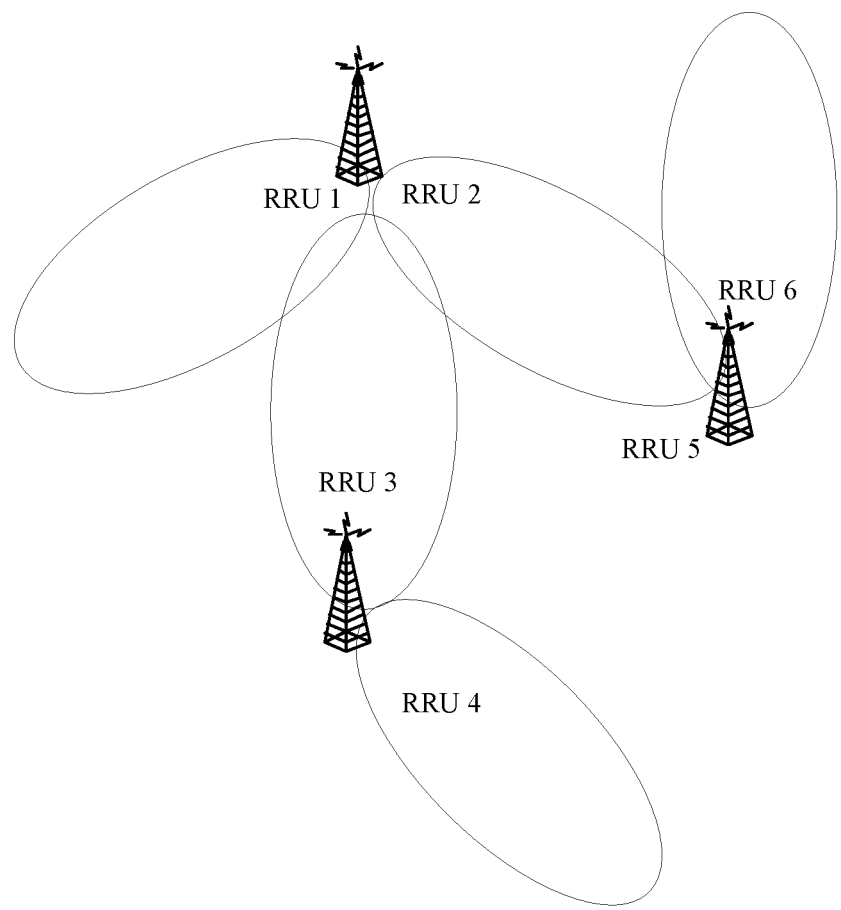
FIG. 3 is a schematic diagram of a network architecture according to an embodiment of this application.

For example, FIG. 3 is a schematic diagram of a network architecture according to an embodiment of this application. In FIG. 3, an RRU 1 to an RRU 6 each include 2×2 antennas. Same antenna ports are configured for the RRU 1 and the RRU 2 and are numbered 0 and 1, same antenna ports are configured for the RRU 3 and the RRU 4 and are numbered 2 and 3, and same antenna ports configured for the RRU 5 and the RRU 6 and are numbered 0 and 1. The RRU 2 has a cell joint area with each of the RRU 5 and the RRU 6, the RRU 3 has a cell joint area with each of the RRU 1 and the RRU 2, and the RRU 5 has a cell joint area with each of the RRU 3 and the RRU 4.

The access network device periodically counts the quantity of terminals connected to each RRU. When the access network device determines that both a quantity of terminals in a cell joint area between the RRU 2 and RRU 5 and a quantity of terminals in a cell joint area between the RRU 2 and RRU 6 are greater than a quantity of terminals in a cell joint area between the RRU 2 and the RRU 3, the access network device may reconfigure the antenna ports of the RRU 2 as antenna ports that are different from those of the RRU 5 and the RRU 6, for example, number the antenna ports of the RRU 2 2 and 3. In this way, more terminals enter a cell joint area that supports 4×4 virtual MIMO. Certainly, the foregoing is merely an example, antenna ports of an RRU may be re-determined based on terminal signal quality, and details are not described herein.

Based on a same technical concept, an embodiment of this application further provides an antenna port configuration apparatus. The apparatus may execute the foregoing method embodiment.

Figure 4:
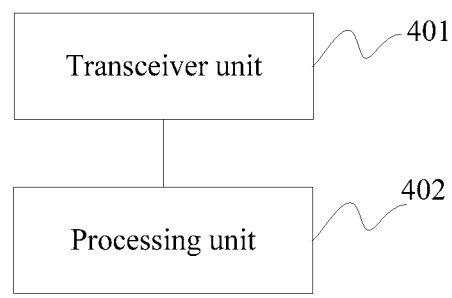
FIG. 4 is a schematic structural diagram of an antenna port configuration apparatus according to an embodiment of this application.

FIG. 4 is a schematic structural diagram of an antenna port configuration apparatus according to an embodiment of this application.

Referring to FIG. 4, the apparatus includes:

a transceiver unit 401, configured to obtain M reference signal received power RSRP differences, where the M RSRP differences indicate radio signal strengths of N radio remote units RRUs, and both M and N are positive integers greater than 1; and a processing unit 402, configured to: determine, based on the M RSRP differences, an order of traversing the N RRUs; and for any RRU of the N RRUs, configure same antenna ports for two RRUs in the traversal order that are adjacent to the RRU, and configure different antenna ports for the RRU and the RRUs adjacent to the RRU.

Optionally, the N RRUs work in a time division duplex TDD mode; and any one of the M RSRP differences is a difference between downlink RSRPs of two of the N RRUs.

The processing unit 402 is configured to:

select one RRU from the N RRUs as a target RRU;

use, as a target RSRP difference, a minimum RSRP difference in the M RSRP differences that is determined based on a downlink RSRP of the target RRU;

mark the target RRU, use the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and determine an order of marking all the N RRUs as the order of traversing the N RRUs.

Optionally, the N RRUs work in a frequency division duplex FDD mode; and any one of the M RSRP differences is a difference between a downlink RSRP of one of the N RRUs and an uplink RSRP of a terminal.

The processing unit 402 is configured to:

sort the M RSRP differences in ascending/descending order;

sequentially mark, based on an order of the sorted M RSRP differences, the RRUs corresponding to all the RSRP differences; and determine an order of marking all the N RRUs as the order of traversing the N RRUs.

Optionally, the processing unit 402 is configured to:

configure logical port numbers of the antenna ports of the two RRUs in the traversal order that are adjacent to the RRU as 0 and 1, and configure logical port numbers of antenna ports of the RRU as 2 and 3.

Optionally, the processing unit 402 is further configured to:

obtain a quantity of terminals in each of K cell joint areas, where each of the K cell joint areas is an area formed by an overlapping area between two of the N RRUs;

determine P cell joint areas including largest quantities of terminals in the K cell joint areas, where P is less than or equal to K; and if determining that a target cell joint area exists in the P cell joint areas, configure different logical port numbers for antenna ports of two RRUs corresponding to the target cell joint area, where the target cell joint area is an area in which same logical port numbers are configured for the antenna ports of the two corresponding RRUs.

Based on a same technical concept, an embodiment of this application further provides an antenna port configuration apparatus. The apparatus may execute the foregoing method embodiment.

Figure 5:
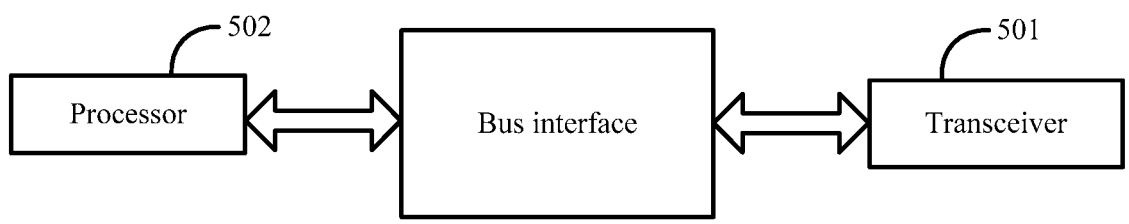
FIG. 5 is a schematic structural diagram of an antenna port configuration apparatus according to an embodiment of this application.

FIG. 5 is a schematic structural diagram of an antenna port configuration apparatus according to an embodiment of this application.

Referring to FIG. 5, the apparatus includes:

a transceiver 501, configured to obtain M reference signal received power RSRP differences, where the M RSRP differences indicate radio signal strengths of N radio remote units RRUs, and both M and N are positive integers greater than 1; and a processor 502, configured to: determine, based on the M RSRP differences, an order of traversing the N RRUs; and for any RRU of the N RRUs, configure same antenna ports for two RRUs in the traversal order that are adjacent to the RRU, and configure different antenna ports for the RRU and the RRUs adjacent to the RRU.

Optionally, the N RRUs work in a time division duplex TDD mode; and any one of the M RSRP differences is a difference between downlink RSRPs of two of the N RRUs.

The processor 502 is configured to:

select one RRU from the N RRUs as a target RRU;

use, as a target RSRP difference, a minimum RSRP difference in the M RSRP differences that is determined based on a downlink RSRP of the target RRU;

mark the target RRU, use the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and determine an order of marking all the N RRUs as the order of traversing the N RRUs.

Optionally, the N RRUs work in a frequency division duplex FDD mode; and any one of the M RSRP differences is a difference between a downlink RSRP of one of the N RRUs and an uplink RSRP of a terminal.

The processor 502 is configured to:

sort the M RSRP differences in ascending/descending order;

sequentially mark, based on an order of the sorted M RSRP differences, the RRUs corresponding to all the RSRP differences; and determine an order of marking all the N RRUs as the order of traversing the N RRUs.

Optionally, the processor 502 is configured to:

configure logical port numbers of the antenna ports of the two RRUs in the traversal order that are adjacent to the RRU as 0 and 1, and configure logical port numbers of antenna ports of the RRU as 2 and 3.

Optionally, the processor 502 is further configured to:

obtain a quantity of terminals in each of K cell joint areas, where each of the K cell joint areas is an area formed by an overlapping area between two of the N RRUs;

determine P cell joint areas including largest quantities of terminals in the K cell joint areas, where P is less than or equal to K; and if determining that a target cell joint area exists in the P cell joint areas, configure different logical port numbers for antenna ports of two RRUs corresponding to the target cell joint area, where the target cell joint area is an area in which same logical port numbers are configured for the antenna ports of the two corresponding RRUs.

In FIG. 5, a bus interface may be further included, and the bus interface provides an interface. The bus interface may include any quantity of interconnected buses and bridges, and link together various circuits of one or more processors represented by the processor and a memory represented by a memory. The bus interface may further link together various other circuits such as a peripheral device, a voltage stabilizer, and a power management circuit. These are well known in the art, and therefore are not further described in this specification.

Persons skilled in the art may clearly know that mutual reference may be made between descriptions of the embodiments provided in the present invention. For convenience and conciseness of description, for functions and executed steps of the apparatuses or devices provided in the embodiments of the present invention, refer to related descriptions in the method embodiment of the present invention, and details are not described herein again.

Persons skilled in the art should understand that the embodiments of this application may be provided as a method or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate a device for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may alternatively be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although some example embodiments of this application have been described, persons skilled in the art can make changes and modifications to these embodiments once they learn the basic inventive concept. Therefore, the following claims are intended to be construed as to cover the example embodiments and all changes and modifications falling within the scope of this application.

Obviously, persons skilled in the art can make various modifications and variations to this application without departing from the scope of this application. This application is intended to cover these modifications and variations of this application provided that they fall within the scope defined by the claims of this application and their equivalent technologies.

What is claimed is:

1. An antenna port configuration method, comprising:
    obtaining, by an access network device, M reference signal received power (RSRP) differences, wherein the M RSRP differences indicate radio signal strengths of N radio remote units (RRUs), and wherein both M and N are positive integers greater than 1;
    determining, by the access network device based on the M RSRP differences, an order of traversing the N RRUs; and
    for any RRU of the N RRUs:
        configuring, by the access network device, antenna ports for two RRUs in the traversal order that are adjacent to the RRU, wherein the antenna ports for the two RRUs are configured to be the same; and
        configuring, by the access network device, antenna ports for the RRU, wherein the antenna ports for the RRU are configured to be different from the antenna ports for the two RRUs.

2. The method according to claim 1, wherein the N RRUs work in a time division duplex (TDD) mode;
    wherein any one of the M RSRP differences is a difference between downlink RSRPs of two of the N RRUs; and
    wherein the determining, by the access network device based on the M RSRP differences, an order of traversing the N RRUs comprises:
        selecting, by the access network device, one RRU from the N RRUs as a target RRU;
        using, as a target RSRP difference by the access network device, a minimum RSRP difference in the M RSRP differences that is determined based on a downlink RSRP of the target RRU;
        marking, by the access network device, the target RRU, using the other RRU used for determining the target RSRP difference as a new target RRU, and returning to the step of using, as a target RSRP difference, a minimum RSRP difference in the M RSRP differences that is determined based on a downlink RSRP of the target RRU, until all of the N RRUs are marked; and determining, by the access network device, an order of marking all the N RRUs as the order of traversing the N RRUs.

3. The method according to claim 1, wherein the N RRUs work in a frequency division duplex (FDD) mode;

wherein any one of the M RSRP differences is a difference between a downlink RSRP of one of the N RRUs and an uplink RSRP of a terminal; and wherein the determining, by the access network device based on the M RSRP differences, an order of traversing the N RRUs comprises:

sorting, by the access network device, the M RSRP differences in ascending/descending order;

sequentially marking, by the access network device based on an order of the sorted M RSRP differences, the RRUs corresponding to all the RSRP differences; and determining, by the access network device, an order of marking all the N RRUs as the order of traversing the N RRUs.

4. The method according to claim 1, wherein the configuring, by the access network device, same antenna ports for two RRUs in the traversal order that are adjacent to the RRU, and configuring different antenna ports for the RRU and the RRUs adjacent to the RRU comprises:

configuring, by the access network device, logical port numbers of the antenna ports of the two RRUs in the traversal order that are adjacent to the RRU as 0 and 1, and configuring logical port numbers of antenna ports of the RRU as 2 and 3.

5. The method according to claim 1, wherein after the configuring, by the access network device, same antenna ports for two RRUs in the traversal order that are adjacent to the RRU, and configuring different antenna ports for the RRU and the RRUs adjacent to the RRU, the method further comprises:

obtaining, by the access network device, a quantity of terminals in each of K cell joint areas, wherein each of the K cell joint areas is an area formed by an overlapping area between two of the N RRUs;

determining, by the access network device, P cell joint areas comprising largest quantities of terminals in the K cell joint areas, wherein P is less than or equal to K; and in response to determining that a target cell joint area exists in the P cell joint areas, configuring, by the access network device, different logical port numbers for antenna ports of two RRUs corresponding to the target cell joint area, wherein the target cell joint area is an area in which same logical port numbers are configured for the antenna ports of the two corresponding RRUs.

6. An antenna port configuration apparatus, comprising:

a transceiver, the transceiver configured to obtain M reference signal received power (RSRP) differences, wherein the M RSRP differences indicate radio signal strengths of N radio remote units (RRUs), and wherein both M and N are positive integers greater than 1; and at least one processor, the at least one processor configured to, when executing instructions stored in a non-transitory computer-readable medium:

determine, based on the M RSRP differences, an order of traversing the N RRUs; and for any RRU of the N RRUs:

configure antenna ports for two RRUs in the traversal order that are adjacent to the RRU, wherein the antenna ports for the two RRUs are configured to be the same; and configure antenna ports for the RRU, wherein the antenna ports for the RRU are configured to be different from the antenna ports for the two RRUs.

7. The apparatus according to claim 6, wherein the N RRUs work in a time division duplex (TDD) mode;

wherein any one of the M RSRP differences is a difference between downlink RSRPs of two of the N RRUs; and wherein the determine, based on the M RSRP differences, an order of traversing the N RRUs comprises:

select one RRU from the N RRUs as a target RRU;

use, as a target RSRP difference, a minimum RSRP difference in the M RSRP differences that is determined based on a downlink RSRP of the target RRU;

mark the target RRU, use the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and determine an order of marking all the N RRUs as the order of traversing the N RRUs.

8. The apparatus according to claim 6, wherein the N RRUs work in a frequency division duplex (FDD) mode;

wherein any one of the M RSRP differences is a difference between a downlink RSRP of one of the N RRUs and an uplink RSRP of a terminal; and wherein the determining, based on the M RSRP differences, an order of traversing the N RRUs comprises:

sort the M RSRP differences in ascending/descending order;

sequentially mark, based on an order of the sorted M RSRP differences, the RRUs corresponding to all the RSRP differences; and determine an order of marking all the N RRUs as the order of traversing the N RRUs.

9. The apparatus according to claim 6, wherein the at least one processor is configured to:

configure logical port numbers of the antenna ports of the two RRUs in the traversal order that are adjacent to the RRU as 0 and 1, and configure logical port numbers of antenna ports of the RRU as 2 and 3.

10. The apparatus according to claim 6, wherein the at least one processor is further configured to:

obtain a quantity of terminals in each of K cell joint areas, wherein each of the K cell joint areas is an area formed by an overlapping area between two of the N RRUs;

determine P cell joint areas comprising largest quantities of terminals in the K cell joint areas, wherein P is less than or equal to K; and in response to determining that a target cell joint area exists in the P cell joint areas, configure different logical port numbers for antenna ports of two RRUs corresponding to the target cell joint area, wherein the target cell joint area is an area in which same logical port numbers are configured for the antenna ports of the two corresponding RRUs.

11. A computer program product stored in a non-transitory computer-readable medium, comprising instructions which, when executed by a computer, cause the computer to:

obtain M reference signal received power (RSRP) differences, wherein the M RSRP differences indicate radio signal strengths of N radio remote units (RRUs), and both M and N are positive integers greater than 1;

determine an order of traversing the N RRUs based on the M RSRP differences; and for any RRU of the N RRUs:
configure antenna ports for two RRUs in the traversal order that are adjacent to the RRU, wherein the antenna ports for the two RRUs are configured to be the same; and
configure antenna ports for the RRU, wherein the antenna ports for the RRU are configured to be different from the antenna ports for the two RRUs.

12. The computer program product according to claim 11, wherein the N RRUs work in a time division duplex (TDD) mode;
wherein any one of the M RSRP differences is a difference between downlink RSRPs of two of the N RRUs; and
wherein the determining an order of traversing the N RRUs based on the M RSRP differences comprises:
select one RRU from the N RRUs as a target RRU;
use a minimum RSRP difference in the M RSRP differences that is determined based on a downlink RSRP of the target RRU as a target RSRP difference;
mark the target RRU, using the other RRU used for determining the target RSRP difference as a new target RRU, and return to the step of using, as a target RSRP difference, a minimum RSRP difference in the M RSRP differences that is determined based on a downlink RSRP of the target RRU, until all of the N RRUs are marked; and
determine an order of marking all the N RRUs as the order of traversing the N RRUs.

13. The computer program product according to claim 11, wherein the N RRUs work in a frequency division duplex (FDD) mode;
wherein any one of the M RSRP differences is a difference between a downlink RSRP of one of the N RRUs and an uplink RSRP of a terminal; and
wherein the determine, based on the M RSRP differences, an order of traversing the N RRUs comprises:
sort the M RSRP differences in ascending/descending order;
sequentially mark the RRUs corresponding to all the RSRP differences, based on an order of the sorted M RSRP differences; and
determine an order of marking all the N RRUs as the order of traversing the N RRUs.

14. The computer program product according to claim 11, wherein the instructions cause the computer to:
configure logical port numbers of the antenna ports of the two RRUs in the traversal order that are adjacent to the RRU as 0 and 1, and configure logical port numbers of antenna ports of the RRU as 2 and 3.

15. The computer program product according to claim 11, wherein the instructions cause the computer to:
obtain a quantity of terminals in each of K cell joint areas, wherein each of the K cell joint areas is an area formed by an overlapping area between two of the N RRUs;
determine P cell joint areas comprising largest quantities of terminals in the K cell joint areas, wherein P is less than or equal to K; and
in response to determining that a target cell joint area exists in the P cell joint areas, configure different logical port numbers for antenna ports of two RRUs corresponding to the target cell joint area, wherein the target cell joint area is an area in which same logical port numbers are configured for the antenna ports of the two corresponding RRUs.

* * * * *